United States Patent [19]

Baird et al.

[11] Patent Number: 5,439,996
[45] Date of Patent: Aug. 8, 1995

[54] SYNTHESIS OF POLYMERS OF VINYL ETHERS, 1,5-HEXADIENE AND N-VINYLCARBAZOLE

[75] Inventors: Michael C. Baird; Qinyan Wang, both of Kingston, Canada

[73] Assignee: Queen's University at Kingston, Kingston, Canada

[21] Appl. No.: 251,989

[22] Filed: Jun. 1, 1994

[51] Int. Cl.$^6$ ............................................. C08F 11/76
[52] U.S. Cl. .................................... 526/134; 526/259; 526/266; 526/270; 526/332; 526/336
[58] Field of Search ................ 526/134, 131, 336, 332, 526/270, 266, 259

[56] References Cited

U.S. PATENT DOCUMENTS

| | | | |
|---|---|---|---|
| 3,285,892 | 11/1966 | MacKenzie et al. | 526/134 X |
| 3,285,896 | 11/1966 | MacKenzie et al. | 526/134 X |
| 3,285,898 | 11/1966 | MacKenzie et al. | 526/134 X |
| 5,064,802 | 11/1991 | Stevens et al. | 502/155 |
| 5,132,380 | 7/1992 | Stevens et al. | 526/126 |
| 5,153,157 | 10/1992 | Hlatky et al. | 502/117 |
| 5,162,278 | 11/1992 | Razavi | 502/152 |
| 5,198,401 | 3/1993 | Turner et al. | 502/155 |
| 5,206,197 | 4/1993 | Campbell et al. | 502/103 |
| 5,223,468 | 6/1993 | Razavi | 502/152 |
| 5,241,025 | 8/1993 | Hlatky et al. | 526/129 |
| 5,296,433 | 3/1994 | Siedle et al. | 502/117 |

OTHER PUBLICATIONS

C. Pellechia (1992) Makromal Chem Rapid Commun. 13, 265–268.

*Primary Examiner*—Mark Nagumo
*Attorney, Agent, or Firm*—R. J. Hicks

[57] ABSTRACT

A process for the production of high molecular weight poly(vinyl ethers) and the like in which a selected monomer is polymerized in the presence of a metallocene-type catalyst is described. Vinyl ether monomers, N-vinylcarbazole and 1.5–10 hexadiene can be polymerized, in high yield using an initiator of the formula Cp*TiMe$_3$ in the presence of a co-initiator of the formula B(C$_6$F$_5$)$_3$. Novel dihydropyran polymers, such as poly 3,4-dihydropyran have also been produced.

10 Claims, No Drawings

SYNTHESIS OF POLYMERS OF VINYL ETHERS, 1,5-HEXADIENE AND N-VINYLCARBAZOLE

CROSS REFERENCE TO RELATED APPLICATION

This application is related to earlier filed U.S. patent application Ser. No. 08/108,968 filed 19 Aug. 1993.

FIELD OF INVENTION

This invention relates to the production of polymers of vinyl ethers, 1,5-hexadiene, dihydrofuran, dihydropyrans and N-vinylcarbazole, using a titanium, hafnium or zirconium pentamethylcyclopentadienyl complex as initiator in the presence of a co-initiator. More particularly, this invention relates to the polymerization of olefins, such as methyl vinyl ether, ethyl vinyl ether, 2,3-dihydropyran and 3,4-dihydro-2H-pyran, 1,5 hexadiene and N-vinylcarbazole using Cp*TiMe$_3$ as an initiator and a borane co-initiator, such as B(C$_6$F$_5$)$_3$ or B(C$_6$H$_5$)(C$_6$F$_5$)$_2$.

BACKGROUND OF INVENTION

The titanium based catalyst Cp*TiMe$_3$ where Cp*=$\eta^5$ pentamethylcyclopentadienyl, activated with tris(pentafluorophenyl) boron [B(C$_6$F$_5$)$_3$] in a toluene solvent has been described in Macromol Chem Rapid Commun. 13, 265–268 (1992). This catalyst system has also been used to produce syndiotactic polystyrene (see U.S. application 08/108,968 supra)., and it has also been demonstrated that the formation of syndiotactic polystyrene involves carbocationic initiation of the styrene polymerization by a cationic titanium complex rather than coordination polymerization (Ziegler-Natta process) by the titanium complex (Baird et al, J. Am. Chem. Soc., in press).

It has now been found that the Cp*TiMe$_3$ initiator, with the same B(C$_6$F$_5$)$_3$ co-initiator can be used to produce a whole range of poly(vinyl ethers), hexadienes, hydrofurans, hydropyrans and N-vinylcarbazoles, many of which are also susceptible to polymerization via carbocationic initiation.

Included within the monomers to be polymerized by the process of the present invention are: methyl vinyl ether; ethyl vinyl ether; isobutyl vinyl ether; ethyl 1-propenyl ether; 2,3-dihydrofuran; 3,4-dihydro-2H-pyran; 9-vinylcarbazole; and 1,5-hexadiene. Ethyl vinyl ether and isobutyl vinyl ether are predominantly sticky liquid polymers which may be used as adhesives. Polyvinylcarbazoles have utility as photoconductive materials used in imaging applications such as laser printing and photocopying. In general, poly(alkyl vinyl ethers) find wide application as adhesives, surface coatings, lubricates, greases, elastomers, molding compounds, fibers, and films as well as in chemical processing.

Object of Invention

One object of the present invention is to provide an improved process for producing poly(vinyl ethers) using metallocene type catalysts.

Another object of the present invention is to provide poly(vinyl ethers) having higher molecular weight than heretofore achieved.

Yet another object of this invention is to provide novel dihydropyran polymers.

Brief Statement of Invention

By one aspect of this invention there is provided a process for polymerizing monomers selected from the group consisting of vinyl ethers, hexadienes, hydrofurans, hydropyrans, and vinylcarbazoles, comprising reacting a selected said monomer in the presence of a catalyst comprising Cp*MMe$_3$, where Cp* is $\eta^5$-pentamethylcyclopentadienyl, M is selected from Titanium, Hafnium and Zirconium and Me is methyl; and a borane co-initiator in a solvent therefor.

By another aspect of this invention there is provided polymeric 3-4 dihydropyran having a molecular weight in the range 1.2–2.6×10$^3$ and an M$_w$/M$_n$ in the range 1.4–2.1.

DETAILED DESCRIPTION OF PREFERRED EMBODIMENTS

Ziegler-Natta catalysts for the polymerization of olefins are, of course, well known, and in recent years considerable effort has been expended to provide improved catalysts for this purpose. The metallocene-alumoxane catalysts, whether homogeneous or supported are generally high activity and more versatile than traditional Ziegler-Natta catalysts, but they are expensive, air sensitive and difficult to manipulate. Other polymerization initiators in which the component, Cp*M(Me)$_3$ where Cp* is a $\eta^5$- pentamethylcyclopentadienyl M is selected from a group IV B metal selected from zirconium, hafnium and titanium, is activated with a borane co-initiator such as B(C$_6$F$_5$)$_3$, have also been described in the literature and have been found effective in producing the high molecular weight polymers of the present invention. Other borane co-initiators such as B(C$_6$H$_5$)(C$_6$F$_5$)$_2$ and similar compounds are also contemplated.

The present invention will be illustrated by means of specific examples hereinafter. In all cases differential scanning calorimetric (DSC) measurements were recorded using a Mettler TA 3000 system. Gel permeation chromatography (GPC) experiments with the polymers were carried out at room temperature in THF as eluant using a Waters Associates Model 440 with Differential Refractometer R401; the data were analyzed using polystyrene calibration curves. The $^{13}$C{$^1$H}— and $^1$H-NMR spectra were recorded using Bruker AC-200 and AM-400 spectrometers. Crystallinity in some products was assessed utilizing a Nikon Labophot-2 polarizing microscope.

EXAMPLE 1

Methyl Vinyl Ether (MVE)

All operations were carried out under an atmosphere of purified nitrogen. Methyl vinyl ether monomer (30 mmol) was passed through a column containing molecular sieves 3A, then condensed at −78° C. (dry ice-isopropanol bath) without further purification. Cp*TiMe$_3$ (0.06 mmol, purified by recrystallization) was dissolved in 1.5 mL toluene, and polymerization was initiated by rapid addition of the Cp*TiMe$_3$ solution and a solution of B(C$_6$F$_5$)$_3$ (0.06 mmol) in 1.5 mL in toluene. The polymerization was carried out at −78° C., and was completed within a short time. Volatile materials were removed under reduced pressure, and purification of the resulting orange, sticky polymer to remove residual catalyst was accomplished by dissolving the material in toluene at room temperature containing 0.5% BHT (2,6-di-tert-butyl-4-methylphenol, an antioxidant) followed by elution through a column containing silicon gel under nitrogen. The pure polymer was obtained by removing the solvent under vacuum. The polyMVE obtained was a yellow, sticky liquid with $M_w=4.7\times10^4$, $M_w/M_n=1.5$. If no BHT were added during purification, $M_w=3.3\times10^4$, $M_w/M_n=5.1$ $^{13}C\{^1H\}$-NMR spectroscopy (room temperature in toluene-$d_8$) showed that the polymer contained 48% r, 52% m dyads.

Representative data from the literature: $M_w=M_w=0.5-1.7\times10^4$, $M_w/M_n=1.1-3.0$.

EXAMPLE 2

Ethyl Vinyl Ether (EVE)

All operations were carried out under an atmosphere of purified nitrogen. Small aliquots of Cp*TiMe$_3$ (0.03 mmol, purified by recrystallization or sublimation) were dissolved in the EVE (15 mmol, purified by degassing and vacuum distillation), and polymerization was initiated by rapid addition of B(C$_6$F$_5$)$_3$ (0.03 mmol) dissolved in a solvent. Polymerization was generally completed in a very short time and volatile materials were removed under reduced pressure. Purification of the resulting very dark, sticky polymer to remove entrained catalyst was generally accomplished by dissolving the material in n-hexane at room temperature followed by elution through a column containing silicon gel. The pure polymer was obtained by removing the solvent under vacuum and is a sticky, light yellow liquid.

The effects of varying the temperature on the polymerization of EVE were investigated in toluene at room temperature (RT) and −78° C. (dry ice-isopropanol bath). Because the polymerization process is highly exothermic, a water-cooled condensor was used with the RT runs. PolyEVE of high molecular weight (2.6–5.0×10$^4$) and narrow molecular weight distribution ($M_w/M_n$ 1.2–1.9) was best obtained at the lower temperature. Polymerization of EVE carried out at low temperature (−78° C.) normally resulted in the formation of a very sticky, high molecular weight, liquid polymer.

At both temperatures the polyEVE formed was a mixture of isotactic, syndiotactic and atactic material (−30% mm triads, −45% mr triads, ∼25% rr triads). Effects of solvent polarity on polymerizations of EVE was investigated at −78° C. using toluene, 1:1 toluene-hexane, CH$_2$Cl$_2$ and 9:1 toluene-THF. Changing the solvent polarities has little effect on the stereoregularity or the molecular weight distributions of the polyEVE products, but polymer prepared in 9:1 toluene-THF was of higher molecular weight (up to 7.7×10$^4$) and was rather stiff, almost a solid.

Note that while B(C$_6$F$_5$)$_3$ is an initiator of mild activity for polymerization at room temperature, it is relatively inactive at −78° C.

Representative data from the literature: $M_w=0.1-4\times10^4$, $M_w/M_n=1.1-2.8$.

EXAMPLE 3

Isobutyl Vinyl Ether (IBVE)

All operations were carried out under an atmosphere of purified nitrogen. Small aliquots of Cp*TiMe$_3$ (0.03 retool, purified by recrystallization or sublimation) were dissolved in the IBVE (15 mmol, purified by degassing and vacuum distillation), and polymerization was initiated by rapid addition of B(C$_6$F$_5$)$_3$ (0.03 mmol) dissolved in a solvent. Polymerization was generally completed in a very short time, and volatile material was removed under reduced pressure. Purification of the resulting very dark, sticky polymer to remove entrained catalyst was generally accomplished by dissolving the material in n-hexane at room temperature followed by elution through a column containing silicon gel. The pure polymer was obtained by removing the solvent under vacuum. The resulting poly(IBVE) is a partially crystalline but predominantly sticky, colourless oil.

The effects of varying the solvent and temperature on the polymerization of IBVE were investigated in toluene, 1:1 toluene-hexane and CH$_2$Cl$_2$ at room temperature (RT) and −78° C. (dry ice-isopropanol bath). Because the polymerization process is highly exothermic, a water-cooled condensor was used with the RT runs. PolyIBVE of high molecular weight (4.1–10.1×10$^4$) and narrow molecular weight distribution ($M_w/M_n$ 1.6–2.4) were obtained at both temperatures in all three solvent systems.

At both temperatures the PolyIBVE formed was a mixture of syndiotactic and atactic material (∼0% mm triads, ∼60% mr triads, ∼40% rr triads). Changing the solvent polarities has little effect on the stereoregularity or the molecular weight distributions of the polyIBVE products.

Representative data from the literature: $M_w=0.8-4\times10^4$, $M_w/M_n=1.1-3.0$.

EXAMPLE 4

Ethyl Propenyl Ether (EPE)

Polymerization of EPE was carried out in various solvents using Cp*TiMe$_3$ as an initiator and B(C$_6$F$_5$)$_3$ as a co-initiator under an atmosphere of purified nitrogen. The molecular ratios of initiator: monomer and initiator: co-initiator were kept constant in all experiments. In general, small aliquots of Cp*TiMe$_3$ (0.03 mmol, purified by recrystallization) were dissolved in EPE (15 mmol, purified by degassing and vacuum distillation), and polymerization was initiated by rapid addition of B(C$_6$F$_5$)$_3$ (0.03 mmol) dissolved in 1.4 mL of solvent. The monomer used contained 24% trans isomer, which was detected by $^1$H-NMR spectroscopy. Since polymerization does not occur at −78° C. in toluene, all polymerization experiments were carried out at RT and were complete in about 30 min; volatile materials were removed under reduced pressure. Purification of the resulting orange-red, sticky polymer to remove residual catalyst was accomplished by dissolving the material in n-hexane at room temperature followed by elution through a column containing silicon gel. The pure polymer was obtained by removing the solvent under vacuum.

The polyEPE obtained forms colourless, glassy solids with $M_w=2.5-4.1\times10^4$, $M_w/M_n=1.2-2.4$ (prepared in toluene), $M_w=1.3-2.4\times10^4$, $M_w/M_n=1.2-1.5$ (prepared in CH$_2$Cl$_2$). All samples of polyEPE were ∼60% diisotactic, ∼40% disyndiotactic, by NMR spectroscopy (room temperature in CDCl$_3$), with little dependence on solvent polarities. Samples prepared in toluene exhibited $T_g$ and $T_m$ values of <0° C. and 53°–55° C., respectively.

Representative data from the literature: $M_w=0.1-4\times10^4$, $M_w/M_n=1.2-1.3$.

EXAMPLE 5

2,3-Dihydrofuran (DHF)

All operations were carried out under an atmosphere of purified nitrogen. Small aliquots of Cp*TiMe$_3$ (0.03 mmol, purified by recrystallization) were dissolved in DHF monomer (15 mmol, purified by degassing and vacuum distillation), and polymerization was initiated by rapid addition of B(C$_6$F$_5$)$_3$ (0.03 mmol) dissolved in 1.9 mL of solvent (toluene or CH$_2$Cl$_2$). The polymerizations are uncontrollably rapid at RT and, even when carried out at −78° C., are completed in seconds; volatile materials were removed tinder reduced pressure. Purification of the resulting polyDHF to remove residual catalyst was accomplished by dissolving the material in toluene at room temperature followed by elution through a column containing silicon gel. The pure polymer was obtained by removing the solvent under vacuum.

PolyDHF prepared in either toluene or CH$_2$Cl$_2$ is a partially crystalline, colourless solid with $M_w=2.5-5.7 \times 10^4$, $M_w/M_n=1.4-1.9$. Samples exhibit $T_g$ and $T_m$ values of 89°–113° C. and ∼187° C., respectively. However, changing solvent polarities has pronounced effects on other properties of polyDHF products. The polymer prepared in toluene is a film, looks like a rubber, and is partially crystalline; the film has a high surface tension and is stable under vacuum at about 50° C. for a few hours. In contrast, the polymer formed in CH$_2$Cl$_2$ is very brittle.

Representative data from the literature: $M_w=0.4-0.7 \times 10^4$, $M_w/M_n=1.3-1.9$.

EXAMPLE 6

3,4-Dihydropyran (DHP)

All operations were carried out under an atmosphere of purified nitrogen. The DHP monomer was passed over an Al$_2$O$_3$ column, stirred over CaH$_2$ for about 2 hours, then filtered and finally purified by degassing and vacuum distillation. Small aliquots of Cp*TiMe$_3$ (0.03 mmol, purified by recrystallization) were dissolved in DHP (15 mmol). Polymerization was initiated by rapid addition of B(C$_6$F$_5$)$_3$ (0.03 mmol) dissolved in 1.6 mL of solvent (toluene or CH$_2$Cl$_2$). Since significant polymerization of 3,4-dihydropyran does not occur at −78° C. over a few hours, all polymerization experiments were carried out at room temperature overnight. Volatile materials were removed under reduced pressure, and purification of the resulting polymer to remove residual catalyst was accomplished by dissolving the material in toluene at room temperature followed by precipitation by adding n-hexane. PolyDHP is a glassy, partially crystalline solid, light yellow in colour.

We find pronounced solvent effects on the formation of polyDHP. Polymerization in toluene take place slowly and some precipitate could be observed at the beginning; after about 1 hour the precipitate redissolved in toluene, and GPC measurement of the precipitate did not show any differences in the final polymer properties. No precipitation occurred during polymerization in CH$_2$Cl$_2$. There is little apparent difference between the polyDHP samples formed in the two solvent systems ($M_w=1.2-2.6 \times 10^3$, $M_w/M_n=1.4-2.1$).

Representative data from the literature: apart from an older report of a poorly characterized polymer, only oligomers seem to have been prepared from this monomer.

EXAMPLE 7

1,5-Hexadiene

Waymouth has recently reported the stereoselective polymerization of non-conjugated diolefins using Group (IV) metallocenes (Waymouth, J. Am. Chem. Soc., 1990, 112, 4953; J. Am. Chem. Soc., 1993, 115, 91). Cyclopolymerization of 1,5-hexadiene using homogenous Ziegler-Natta catalysts consisting of zirconocenes and aluminum alkyl cocatalysts affords poly(methylene-1,3-cyclopentane) (PMCP), a polymer for which four microstructures of maximum order are possible. The cyclopolymerization is a chain growth reaction which is believed to involve insertion of a vinylic function into the transition-metal bond followed by an intramolecular insertion resulting in cyclization.

We found, typically, that combinations of Cp*TiMe$_3$ (0.03 mmol) in 1,5-hexadiene (2 mL) and B(C$_6$F$_5$)$_3$ (0.03 mmol) in toluene (2 mL) at room temperature resulted in heat evolution and in the rapid formation of solid, rubbery, elastomeric PMCP which maintains the shape of the reaction vessel. Reactions were terminated by quenching with acidified methanol, and the polymers were washed with methanol and dried to constant weight at 80° C. Purification of the resulting solid products to remove any entrained catalyst was attempted by solubilizing in 1,2,4-trichlorobenzene, but the products generally failed to dissolve completely. Instead, there was formed a colourless gel which, on precipitation with acidified methanol, afforded white residues which were washed with methanol (3×50 mL aliquots) and dried at 80° C. Reactions were also carried out at −78° C.; solidification of the polymeric products occurred instantaneously and quantitatively, resulting in the formation of highly insoluble material.

These insoluble products exhibited relatively high molecular weights (4.2–5.2×10$^5$) but broad molecular weight distributions ($M_wM_n$ 4.3–4.6) compared to those reported by Waymouth. They form a 'swollen gel' in C$_2$H$_2$Cl$_4$ at 120° C., allowing $^{13}$C{$^1$H} NMR spectra to be recorded. Spectra of selected samples indicated the presence of atactic cis (MmM, MrM) and trans (RrR,MrM) PMCP (capital letters denote relative stereochemistry within rings and lower case letters refer to stereochemistry between rings). From the $^{13}$C{$^1$H} NMR spectral intensities, the cis/trans ratios were ∼1:1. However, the low solubilities of the polymers resulted in poor resolution; in addition, GPC analysis could not be obtained. Resonances in the olefinic region, corresponding to residual unsaturation, were weak.

Reactions were also carried out at room temperature under more dilute conditions (10–20 rather than 2 mL of toluene). In these cases, polymerization yielded orange gels which, on acidic work-up, yielded white precipitates that were soluble in toluene and chloroform at 50° C. Well resolved $^{13}$C{$^1$H} NMR spectra were obtained for these samples and, in all cases, the cis/trans ratio was ∼1: 1. In addition, all spectra exhibited additional resonances attributable to residual olefinic moieties. These resonances become considerably weaker when the polymer samples were heated to 150° C. suggesting that the polymers had undergone cross-linking.

These polymer products were considerably more elastomeric and flexible than those discussed above. The melting temperatures were lower, and the DSCs exhibited broad melting peaks. Interestingly, the DSC thermograms for all the samples exhibited sharp exotherms at ~160° C., suggesting that the polymers were undergoing further cross linking. Consistent with this notion is the fact that polymer samples obtained after DSC analysis were considerably less soluble and much less elastomeric. Indeed, the samples could not be solubilized for further $^{13}C\{^1H\}$ NMR analyses or molecular weight determinations.

Since the reactions carried out at higher concentrations apparently also gave rise to extensive cross linking, affording 'tougher' and highly insoluble polymer products, these reactions appear to raise the possibility for the production of thermosetting materials.

No polymerization was observed to occur when 1,5-hexadiene was reacted with $B(C_6F_5)_3$ in the absence of Cp*TiMe$_3$.

EXAMPLE 8

N-Vinylcarbazole

A solution of Cp*TiMe$_3$ (0.03 retool) and N-vinylcarbazole (0.15 mmol) in toluene or methylene chloride (4 mL) was treated with a solution of $B(C_6F_5)_3$ (0.03 retool) in the same solvent (2 mL) at $-78°$ C. A solid developed immediately, and the reaction was treated with methanol to give a white solid which was dried in vacuo. The molecular weight ($M_w 4 \times 10^6$) and molecular weight distribution ($M_w/M_n$ 3.4) compared with the best of the literature results, but a very similar polymer was prepared with $B(C_6F_5)_3$ in the absence of Cp*TiMe$_3$.

We claim:

1. A process for polymerizing monomers selected from the group consisting of vinyl ethers, hexadienes, dihydrofurans, dihydropyrans and vinylcarbazoles, comprising reacting a selected said monomer in the presence of a catalyst comprising Cp*MMe$_3$ where Cp* is $\eta^5$ pentamethylcyclopentadienyl, M is selected from the group consisting of Titanium, Hafnium and Zirconium and Me is methyl; and a borane co-initiator in a solvent therefor.

2. A process as claimed in claim 1 wherein said monomer is a vinyl ether selected from the group consisting of methyl vinyl ether, ethyl vinyl ether, isobutyl vinyl ether and ethyl propenyl ether.

3. (Amended) A process as claimed in claim 1 wherein said dihydrofuran is 2,3-dihydrofuran.

4. A process as claimed in claim 1 wherein said hexadiene is 1,5-hexadiene.

5. A process as claimed in claim 1 wherein said dihydropyran is 3,4-dihydropyran.

6. A process as claimed in claim 1 wherein said vinylcarbazole is N-vinylcarbazole.

7. A process as claimed in claim 1 wherein M is titanium.

8. A process as claimed in claim 7 wherein said solvent is toluene.

9. A process as claimed in claim 1 wherein said borane co-initiator is selected from the group consisting of $B(C_6F_5)_3$ and $B(C_6H_5)(C_6F_5)_2$.

10. A process as claimed in claim 9 wherein said borane co-initiator is $B(C_6F_5)_3$.

* * * * *

UNITED STATES PATENT AND TRADEMARK OFFICE
CERTIFICATE OF CORRECTION

PATENT NO. : 5,439,996
DATED : 8 August 1995
INVENTOR(S) : M. Baird and Q. Wang

It is certified that error appears in the above-identified patent and that said Letters Patent is hereby corrected as shown below:

at col 3 line 45 amend "-30% mm triads, - 45% mr triads" to read ~30% mm triads, ~45% mr triads at col 3 line 64, col 7 line 21 and col 7 lines 23-24, amend "retool" to read "mmol"

at col 5 line 14 amend "tinder" to read "under"

Signed and Sealed this

Second Day of January, 1996

Attest:

BRUCE LEHMAN

*Attesting Officer*    *Commissioner of Patents and Trademarks*